United States Patent [19]

McKenzie et al.

[11] Patent Number: 4,662,349

[45] Date of Patent: May 5, 1987

[54] BARBECUE GRILL

[75] Inventors: Stuart T. McKenzie, Wyevale; Clifford N. Lilley, Minesing, both of Canada

[73] Assignee: Dart Industries Inc., Northbrook, Ill.

[21] Appl. No.: 763,849

[22] Filed: Aug. 7, 1985

[51] Int. Cl.⁴ .............................................. A47J 37/00
[52] U.S. Cl. ................................ 126/41 R; 126/39 E; 126/25 B; 431/328
[58] Field of Search ................. 126/39 R, 41 R, 39 E, 126/25 B; 99/400, 401, 402, 419, 421 H, 446, 385; 431/328, 329

[56] References Cited

U.S. PATENT DOCUMENTS

| | | |
|---|---|---|
| 2,601,299 | 6/1952 | Kennedy .......................... 431/328 X |
| 3,013,602 | 12/1961 | Heimerl ............................... 431/328 |
| 3,067,811 | 12/1962 | Webster ............................ 126/41 X |
| 3,146,693 | 9/1964 | Pietro ............................ 126/41 R X |
| 3,161,227 | 12/1964 | Goss et al. ......................... 431/328 |
| 3,510,329 | 5/1970 | Partiot .................................. 431/328 |
| 3,547,097 | 12/1970 | Rice ................................ 431/328 X |
| 4,321,857 | 3/1982 | Best ................................ 126/41 R X |
| 4,413,976 | 11/1983 | Scherer ........................... 431/328 X |
| 4,437,833 | 3/1984 | Mertz .............................. 431/328 X |
| 4,508,097 | 4/1985 | Berg ................................. 126/41 R |

OTHER PUBLICATIONS

Grill-Rite TM, Thermo-Rite Mfg., Assemlby Instructions, 8 pages, date unknown.

Primary Examiner—Randall L. Green
Attorney, Agent, or Firm—Gregory J. Mancuso

[57] ABSTRACT

This invention relates to a barbecue grill, and in particular to a high pressure gas fired barbecue grill having perforated ceramic heating elements which emit infrared radiation. A pair of steel rods are suspended in a cast aluminum housing, and a pair of plenum chambers are suspended therebetween. The upper surfaces of each plenum chamber comprises a pair of perforated rectangular ceramic blocks separated by an imperforate metal plate. The bottom of the housing is open, and has a tray carried proximate the opening for food particles.

26 Claims, 15 Drawing Figures

BARBECUE GRILL

BACKGROUND OF THE INVENTION

This invention relates to gas barbecue grills for outdoor use. More particularly, this invention relates to gas barbecue grills in which liquified petroleum gas is supplied under pressure to a duct in which gas and air are intermixed, the mixture then flowing into a plenum chamber in which the gas and air are more thoroughly mixed, the mixture then flowing upward through a multiplicity of holes in a burner plate to burn at the surface of that plate, creating heat and infrared radiation for cooking food placed on a grid located above the burner plate.

Conventional gas barbecue grills typically comprise a box-like shell having a bottom, four sides, and an open top, to which is attached a cover. Across the open top is a grid for supporting food to be cooked. Below the grid is a grate on which refractory briquettes are placed. Below the briquettes are one or more metal gas burners, having a plurality of small holes, to which gas and air are fed through a venturi. The gas is typically supplied to the venturi at a pressure of between about 4 inches and about 11 inches of water. Also typically, the gas is supplied from a high pressure cylinder of liquid petroleum gas, through a pressure regulator which reduces the gas pressure to that desired. The burning gas-air mixture heats the briquettes, and combustion products pass upward through the grid supporting the food. The purposes of the briquettes are to distribute the heat evenly across the underside of the grid, to insulate the gas flames from interference by wind, and to provide a surface on which liquids from cooking foods can be vaporized to enhance the flavor of the foods.

Another type of conventional gas barbecue grill incorporates perforated refractory burner elements. Pressurized gas is supplied through venturis to plenum chambers together with air to form a combustible mixture which passes through holes in the refractory and is ignited and burns on the outer surface of the burner elements. The elements are heated sufficiently to emit convective and infrared radiation.

One problem with both types of conventional barbecues is their susceptibility to wind currents. Drafts tend to extinguish the flames, and consequently cumbersome baffling and other means are required to protect the burners. Another problem, particularly prevelant in barbecues using perforated refractories, is heat distribution. Heat is not distributed uniformly over the food cooking surface. A third problem, also particularly prevalent in barbecues using perforated refractories, is flashback-combusion below the burner surface. A fourth problem in conventional barbecue grills is the difficulty in cleaning them. Food and liquids drip into the grill container and accumulate in the bottom. No convenient means is provided to remove the parts of the barbecue grill or to access the inside bottom of the container.

SUMMARY OF THE INVENTION

The barbecue grill of this invention solves each of the above problems. The barbecue grill of this invention comprises, in one embodiment, a container having upstanding sidewalls forming a cavity having an upper opening. A cover is attached to the container, movable to a closed position over the opening, and to an open position in which the opening is exposed. A substantially horizontal food-holding grid is suspended from the sidewalls proximate the upper opening. Between two opposed sidewalls are supported two support rods in a generally horizontal position. Suspended from and between the two rods are two heat generating systems. Each system comprises a plenum chamber open at the top and having a gas inlet port. Each plenum chamber carries a burner plate over substantially all of the top opening. The burner plate comprises at least two ceramic tiles separated by an imperforate metal plate. The ceramic tiles have a plurality of holes therethrough to allow the passage of gas out from the plenum chambers. A metal tube carried by the metal plate facilitates the propagation of gas from one tile to another over each plenum chamber.

In one embodiment, the barbecue grill of this invention comprises a cast aluminum container about 11 inches high, about 17 inches deep, and about 26 inches wide, open at the top, with a cast aluminum cover hinged at the back of the container. Liquid petroleum gas is supplied from a pressurized system, such as a conventional propane cylinder. The gas passes through a pressure regulator, which reduces the gas pressure to about 40 inches of water. The gas is then injected through a gas inlet orifice of about 0.03 inches in diameter, into two cylindrical ducts, each of which communicates with a plenum chamber. The duct walls have air inlet openings downstream of the gas inlet orifice. It is important to note that the duct differs from a conventional venturi in that it has a generally uniform cross-sectional area, and that no baffle or other means of adjusting the size of the air openings is provided. In the typical low pressure gas burner, gas enters through a venturi which also draws in air for combustion. The air vent in such an arrangement incorporates a baffle so that the amount of air entering the system can be regulated. In conventional low pressure systems, a baffle is desirable because the size of the air vent is critical to control the degree of combustion. The margin of error in sizing the air vent is quite small. Small differences in gas pressure require changes in the sizing of the air vent to provide the proper gas-to-air ratio. It has been found that in the high pressure system of this invention, no means for modulating air flow is required. Satisfactory combustion occurs with fixed air inlets even with typical fluctuations in gas pressure experienced when using bottled gas.

The gas-air mixture passes from each duct into one of the plenum chambers in which the gas and air are intimately mixed. The plenum chambers comprise sheet metal boxes having generally trapezoidal ends connected by generally planar sides of generally equal size and a generally planar horizontal base. In one end of the plenum is the gas inlet port, through which the plenum communicates with the duct. The plenum is open at the top.

Proximate the upper edges of each of the plenum ends is a bracket adapted to engage a metal rod, from which the plenum chamber is removably suspended. A front rod and a rear rod, generally parallel to one another, extend between opposite sides of the container. The rods are removably supported by the container sides by brackets carried by the container sides. The plenum chambers are suspended between the rods in side-by-side relationship.

The top edges of the ends and sides of the plenum form a generally rectangular upper wall in a generally horizontal plane, forming the top opening about 9 inches by about 9 inches. The plenum carries a burner plate which substantially covers the top opening. The burner plate comprises two generally rectangular ceramic tiles of about 9 inches by about 3½ inches, separated by a metal plate of about 9 inches by about 2 inches. The ceramic tiles are about ½ inch thick, and are perforated by about 200 holes per square inch of tile, the holes being of about 0.05 inch in diameter. The metal plate is imperforate. The surfaces of the ceramic tiles are generally flat. The upper surfaces can be slightly scalloped to increase the effective surface area for infrared radiation and to help shield the flame from wind. The gas-air mixture from the plenum passes up through the holes in the ceramic tiles, and is burned proximate the upper surface of the tiles. The metal plate carries a gas transfer tube, which serves to propagate gas across the metal plate from one tile to another during initial ignition of the gas.

Above the burner plates are reverberation screens to intensify the infrared radiation and to help shield the flames from wind currents. The reverberation screens comprise wire mesh screens suspended about ½ inch above the burner plates. Above the reverberation screens are conventional food support grids, on which food is placed for cooking.

In the preferred embodiment, a rotisserie burner extends generally horizontally along the inside of the back wall of the container. The burner comprises a generally cylindrical metal tube having a series of gas discharge orifices arranged horizontally and slightly above the level of the upper surface of the reverberation screens. In one end of the burner is a gas inlet, comprising a venturi and air inlet holes. The other end of the burner is closed and terminates within the container. The rotisserie burner facilitates ignition of the gas-air mixture discharged from the burner plates, as is more fully described below.

The sides of the container form a generally rectangular lower opening of about 16 inches by about 10 inches. The sides carry brackets proximate the opening, from which is slidably suspended a drawer which is adapted to cover the opening in a closed position, and to be removable from the container.

The use of a high pressure gas feed, a uniquely configured gas duct and plenum chamber, burner surface spacers of high heat conductivity, and an enclosure open at the bottom with a removable drawer, together with other aspects of the barbecue grill of this invention explained in more detail below, result in a novel barbecue grill without the limitations of conventional barbecue grills.

DESCRIPTION OF THE PREFERRED EMBODIMENTS

Figure 1:
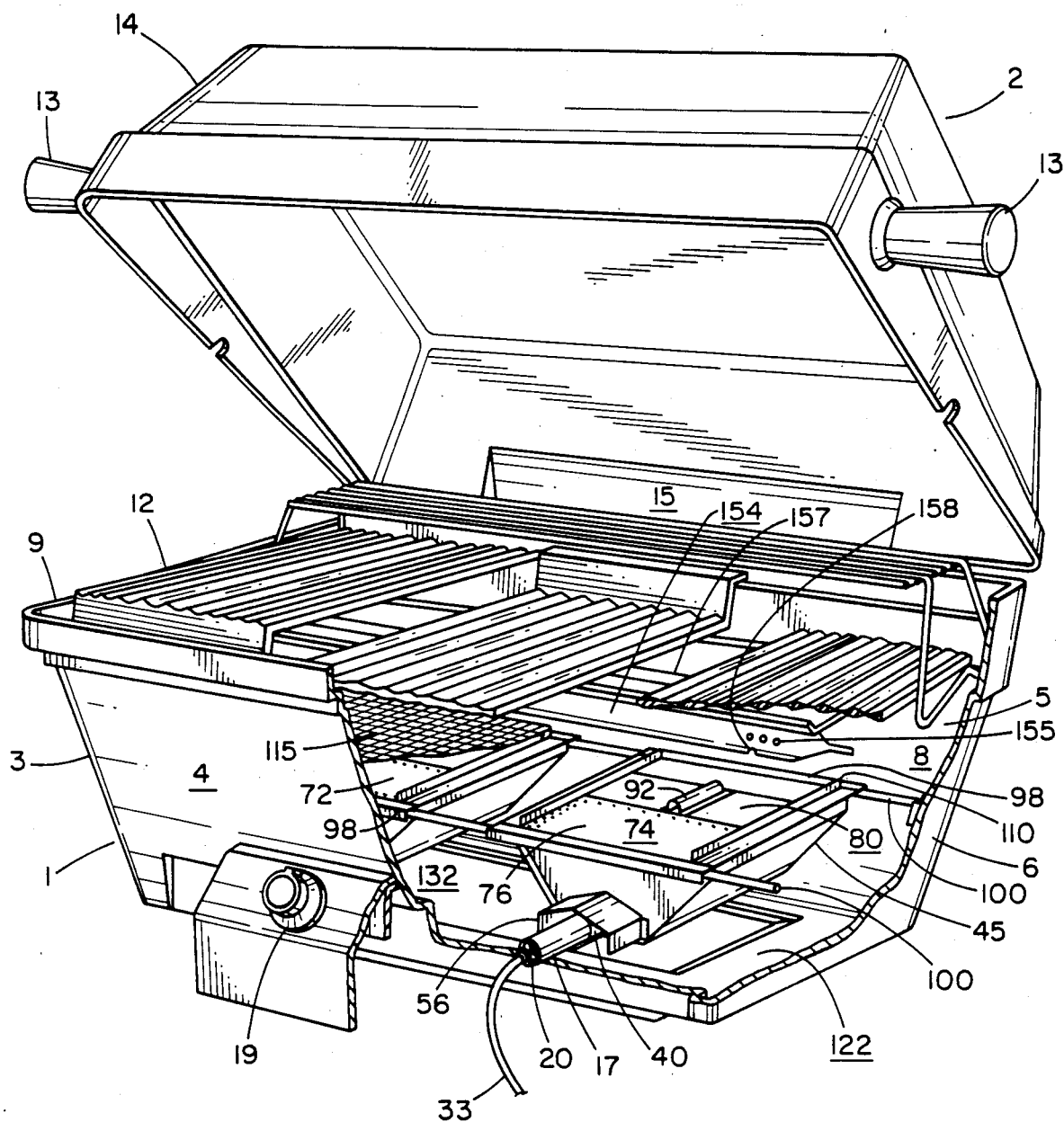
FIG. 1 is a front perspective view, in partial cutaway, of one embodiment of the barbecue grill of this invention.

The following is a description of the preferred embodiments of this invention. It is to be understood that the dimensions recited herein describe the preferred of many embodiments, and that the dimensions can be proportionately increased or decreased to provide a novel and effective barbecue grill within the scope of this invention.

Referring to FIGS. 1-4, the preferred barbecue grill of this invention comprises a cast aluminum container 1 with a cast aluminum cover 2. The container comprises upstanding sidewalls 3 including a front wall 4, rear wall 5, and opposite side walls 6,7 forming a cavity 8 about 11 inches deep and about 12 inches by about 20 inches at the bottom of sidewalls 6,7. The sidewalls 3 extend upwardly and outwardly, terminating in an upper edge 9 which defines a generally rectangular opening about 17 inches by about 26 inches. Formed in sidewalls 3 is a front ledge 10 and a rear ledge 11, adapted to support cooking grid 12, which is about 16 inches by about 25 inches, in a generally horizontal position. Food is placed on cooking grid 12 to be cooked. Cover 2 is hinged to rear wall 5. Cover 2 comprises a generally box-like structure having outwardly projecting handles 13 by which cover 2 may be raised and lowered. In its lowered position, walls 14 of cover 2 engage sidewalls 3 to substantially cover the upper opening in container 1 formed by edge 9. Vent 15 in cover 2 allows combustion products to leave the grill when container 1 is closed by cover 2.

Figure 13:
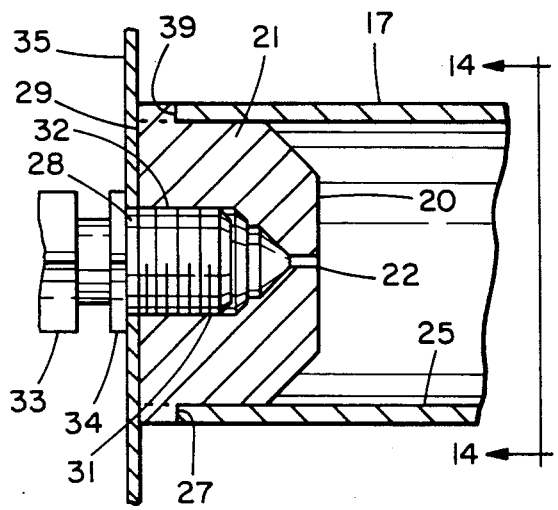
FIG. 13 is a partial sectional view taken on lines 13—13 of FIG. 5.
Figure 14:
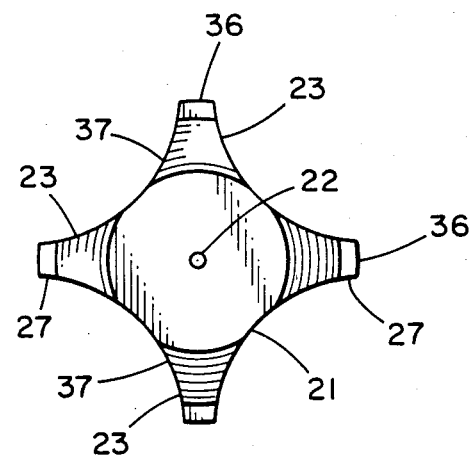
FIG. 14 is a front view of the jet, taken on line 13—13 of FIG. 13 with the duct and frame not shown.
Figure 15:
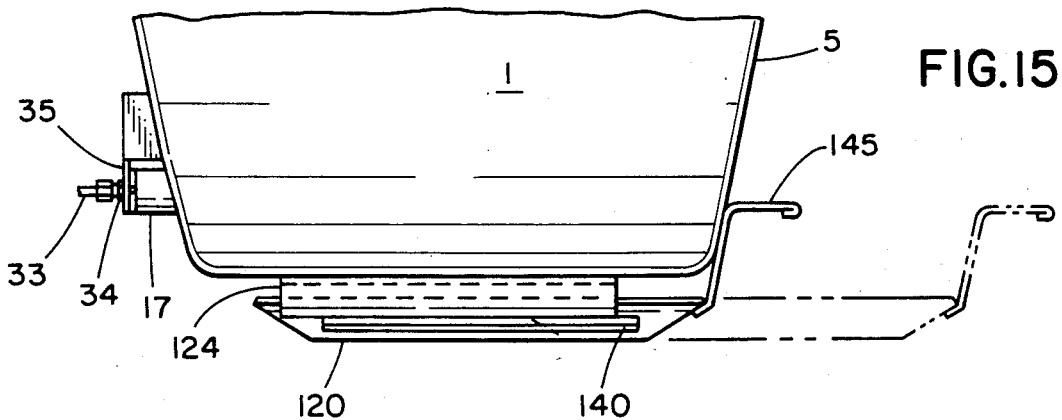
FIG. 15 is a partial side view of the container, showing the drawer closed, and open in dotted lines.

Front wall 4 also defines a pair of openings 16, each of which receives a gas inlet duct 17. Gas inlet ducts 17 comprise metal pipes of generally symmetrical cross-section, having linear axes generally parallel to the side walls 6,7 of container 1. It is preferred that ducts 17 comprise aluminized 20 gauge cylindrical tubes about 4 inches long and about 1 inch O.D. In one end of each of ducts 17 is a gas jet 20. As can best be seen in FIGS. 13 and 14, gas jet 20 comprises a plug 21 having a gas discharge orifice 22 therethrough. Extending radially from the central portion of plug 21 are vanes 23, which serve to locate jet 20 in duct 17 such that orifice 22 is located on the axis of duct 17. Jet 20 is sized to fit snugly in duct 17, with outer surfaces 24 of vanes 23 tightly engaging inner surface 25 of duct 17. Shoulders 27 on vanes 23 engage end surface 28 of duct 17, to locate jet 20 longitudinally in duct 17. When jet 20 is received by duct 17, vanes 23 and inner surface 25 define secondary air inlet orifices 30, through which air is drawn to be mixed with gas entering duct 17 through orifice 22.

Jet 20 also bears female threaded portion 31, into which a male threaded fitting 32 is fit to connect duct 17 through gas supply line 33 and associated gas valve 19 to a pressure regulator which is connected to a source of compressed gas. Jet 20 is secured to container 1 by nut 34. Nut 34 is threaded onto fitting 32 and bears on frame 35 affixed to front wall 4. Frame 35 comprises a generally planar front wall 38 having a pair of holes 28 therein aligned with ducts 17. Wall 38 is spaced from front wall 4 and is generally perpendicular to the longitudinal axis of duct 17. Frame 35 is affixed to container 1 by any convenient means, as by welds or bolts. Fitting 32 passes through hole 28 in frame 35 and is threaded into jet 20. Rear face 29 of jet 20 bears on the side of frame 35 opposite nut 34, to secure jet 20 in place. Because duct 17 is rigidly affixed to components within container 1, as is described below, it is preferred that hole 28 be sized to allow for minor variations in position of duct 17 to facilitate assembly of the barbecue grill.

It is preferred that ends 36 of vanes 23 be about 0.125 inches wide and that surface 37 of jet 20 define a radius of about 0.5 inches, to define the appropriate size of air inlet orifices 30 for a gas pressure of 40 inches of water. It is to be understood that for a particular heat and radiation output, the diameter of orifice 22 is a function of the pressure of the gas supplied to jet 20. The preferred pressure range is from about 20 inches of water to about 60 inches of water. As the pressure of gas supplied to jet 20 is increased, the size of orifice 22 should decrease to maintain the desired mass flow rate of gas through duct 17. With the preferred gas, propane, at the preferred gas pressure of 40 inches of water, the preferred orifice 22 size is 0.031 inches in diameter to generate a maximum of about 15,000 BTU/hour. At those specifications, the mass flow rate is 5.88 cubic feet per hour of propane gas. The appropriate sizing of orifice 22 at other gas inlet pressures is a matter of routine trial and error.

Duct 17 is provided with a pair of primary air inlet vents 40, downstream of the outlet of orifice 22. Vents 40 are generally rectangular in configuration, and located on opposite sides of duct 17. Vents 40 are sized to allow sufficient air to enter duct 17 for substantially complete combustion. In the preferred embodiment, with gas pressure at 40 inches of water and with an orifice 22 size of 0.031 inches, vents 40 are approximately 1.125 inches by 0.7 inches.

It is desired that carbon monoxide production be minimized. At present, the Canadian Gas Association standard is 80 ppm carbon monoxide in the burner effluent gases. The dimensions noted above for orifices 30 and vents 40 yield an effluent carbon monoxide content of about 30 ppm at a gas inlet pressure of about 40 inches of water. A "Drager" meter was used to measure carbon monoxide content in an air-free sample of combustion products. The air-to-fuel ratio is about 2.5. For gas pressures different from 40 inches of water, the sizes of orifices 30 and vents 40 must be increased or decreased proportionately.

Duct 17 communicates with plenum chamber 45, so that the gas-air mixture exiting duct 17 enters plenum chamber 45 and is intimately mixed. Duct 17 is fixed at one end by jet 20 affixed to frame 35 as noted above. Duct 17 passes through an opening 16 in front wall 4 and through gas inlet port 48 in front wall 49 of plenum chamber 45. In the preferred embodiment, duct 17 is affixed to plenum chamber 45 by bracket 53, the top portion 51 of which is welded to duct 17 and the bottom portion 52 of which is welded to floor 55 of plenum chamber 45. Duct 17 fits snugly through inlet port 48, to minimize the passage of gas or air through the interface of wall 49 and duct 17. It is preferred that front wall 49 form a generally cylindrical flange 54 about ¼ inch high about the circumference of port 48, which fits over duct 17. It is also preferred that duct 17 project about one inch into plenum 45, and that the longitudinal axis of duct 17 be generally perpendicular to wall 49. Primary air inlet vents 40 are located between plenum 45 and front wall 4.

As discussed above, jet 20 comprises plug 21 having a gas discharge orifice 22, and radial vanes 23. The location of the gas discharge outlet of orifice 22 with respect to inner surface 25 of duct 17 and with respect to air inlet orifices 40 is important. The gas discharge outlet of orifice 22 should be generally centrally located in duct 17 and aligned such that the gas is discharged as a jet stream in a line generally parallel to the axis of duct 17. As noted above, it is preferred that duct 17 comprise a generally cylindrical tube having a linear axis. It is preferred that orifice 22 comprise a generally cylindrical passage through plug 21 having an axis generally parallel to the axis of duct 17, exiting at front face 26 of plug 21. It is also preferred that front face 26 be generally perpendicular to the axis of duct 17. Vents 40 should comprise rectangular cut-outs in duct 17, of substantially the same dimensions, aligned with one another on opposite sides of duct 17. For a gas inlet pressure of about 40 inches of water, the following dimensions are preferred: duct 17 has an inside diameter of about 1 inch; orifice 22 has a diameter of about 0.031 inches; vents 40 have a total area of about 1.6 inches; air inlet orifices 30 should be sized as noted above; and the distance from face 26 to vents 40 should be about 1 1/16 inches.

As noted above, since the dimensions of the system are a function of the gas pressure adopted, the dimensions recited above are specific to a gas pressure of 40 inches of water. In general terms, the following dimensions are preferred: the distance between face 26 and vent 40 should be between about 0.8 to about 1.2 the inside diameter of duct 17; the diameter of duct 17 should be between about 20 to 50 times the diameter of orifice 22; the ratio of gas pressure, in inches of water, to vent 40 total area, in square inches, should be between about 20 and 30; and the distance duct 17 extends into plenum 45 should be between about 5% to about 30% of the distance between walls 49 and 50 of plenum 45.

Projecting about 1¾ inches from front wall 49 is shield 56, which is intended to prevent food and liquid which falls into container 1 from entering duct 17 through air vents 40. Shield 56 comprises inclined roof portion 57 and vertical sides 58. Tabs 59 extending from sides 58 are tack welded to front wall 49, to secure shield 56 to plenum 45.

A pair of plenum chambers 45 are suspended in container 1. In the preferred embodiment, plenum chambers 45 are substantially identical. Each of plenum chambers 45 preferably comprises a sheet metal box-like structure having a floor 55, a front wall 49, a rear wall 50, and inclined sides 60, of 20 gauge aluminized steel. Port 48 is located in front wall 49, with its axis about 1 inch above floor 55 and centrally located between sides 60. It is preferred that plenums 45 comprise 20 gauge aluminized steel, with generally trapezoidal front and rear walls 49, 50, generally rectangular sides 60, and a generally rectangular floor 55. Plenum chambers 45 are preferably about 3½ inches deep and about 3 inches wide at floor 55.

Figure 4:
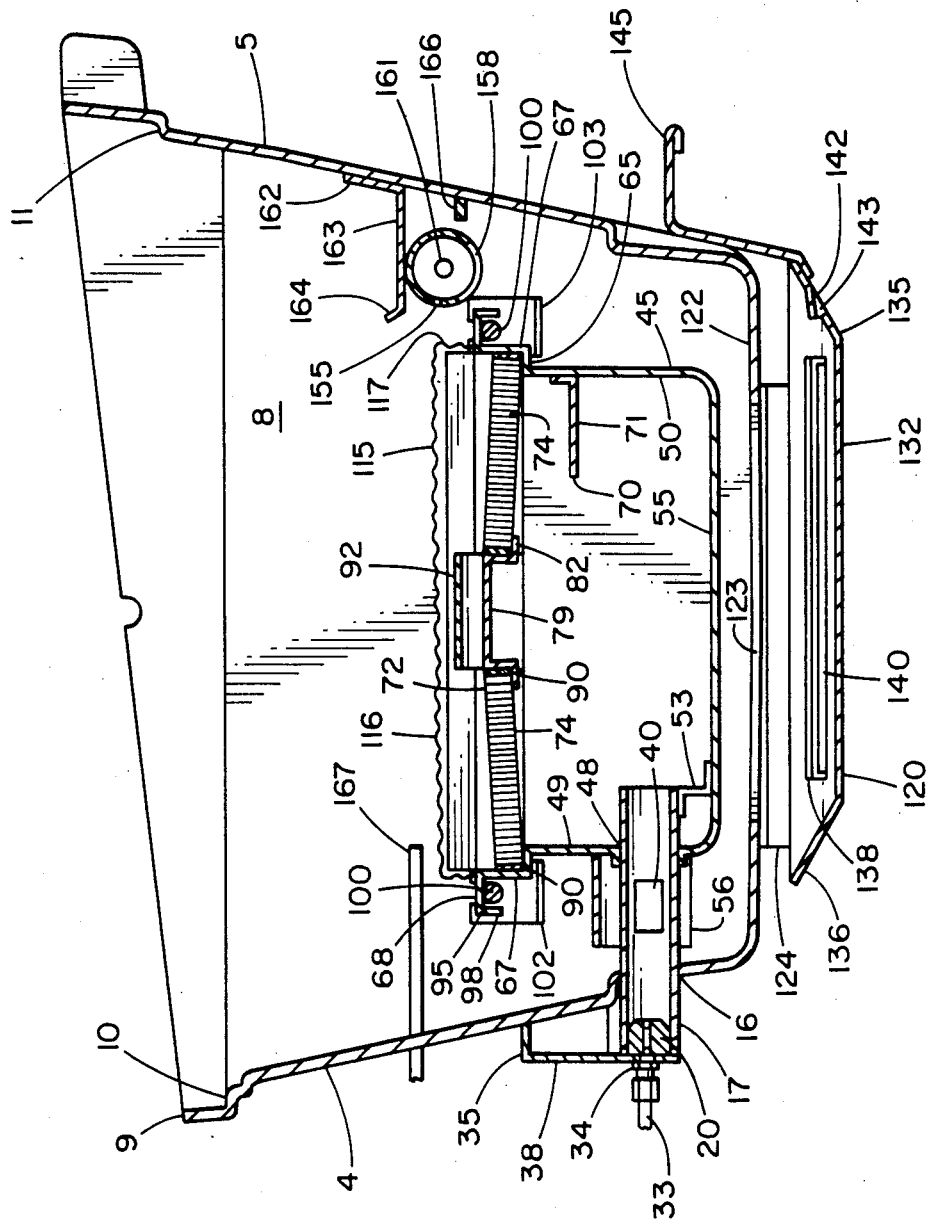
FIG. 4 is a cross sectional view taken on lines 4—4 of FIG. 3.
Figure 5:
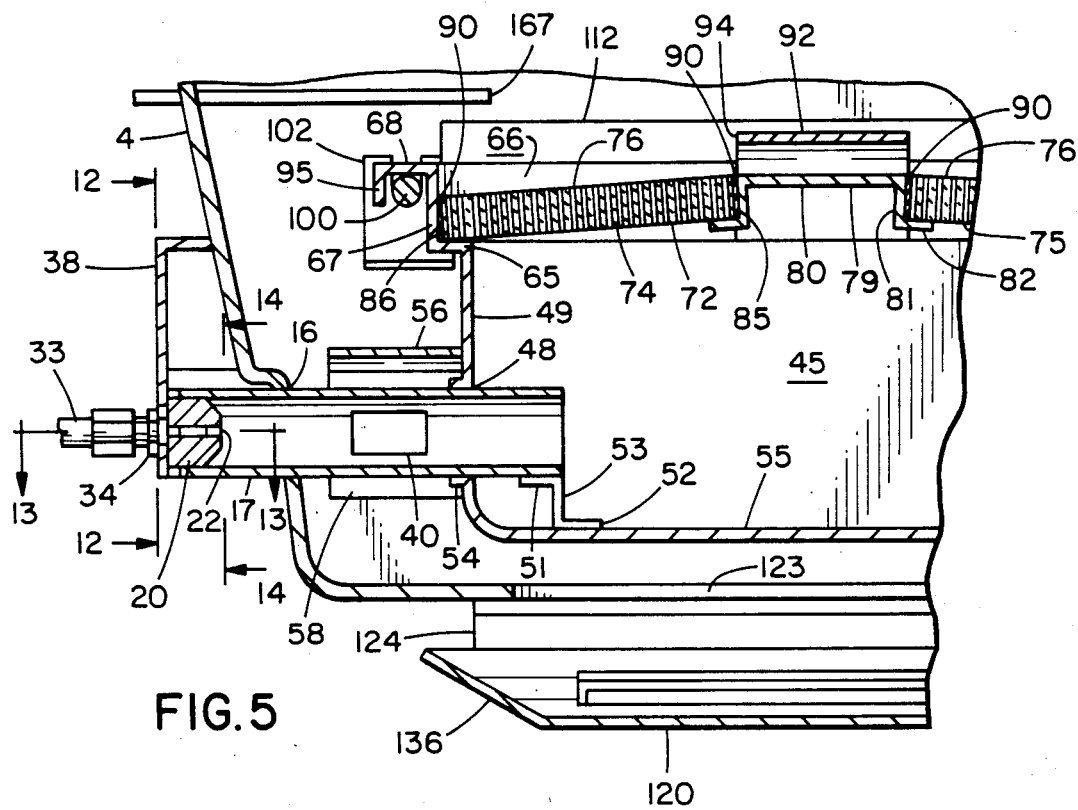
FIG. 5 is an enlarged fragmentary cross sectional view of the view shown in FIG. 4 with the reverberation screen removed.
Figure 10:
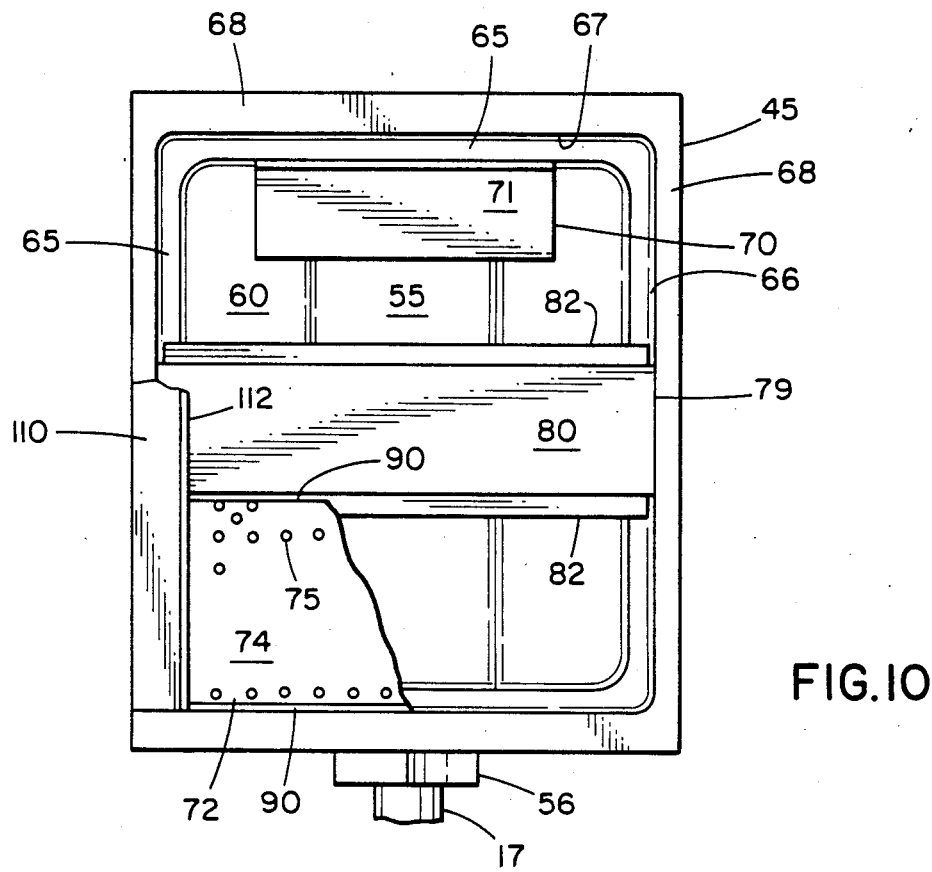
FIG. 10 is a fragmentary top plan view of one plenum chamber, with the reverberation screen removed, and the screen support and tile partially shown.

As can best be seen in FIGS. 4, 5, and 10, walls 49,50 and sides 60 bear shoulder 65 about ¼ inch wide in a generally horizontal plane about the perimeter of plenum 45. Located outwardly from shoulder 65 are generally vertical walls 66 adjacent to sides 60 and generally vertical walls 67 adjacent to front and rear walls 49 and 50. Walls 66 and 67 are about ⅜ inch high and end in top wall 68 about ½ inch wide in a generally horizontal plane. Walls 66 and 67 together form a generally rectangular upper opening in plenum 45 about 9 inches on each side. A single baffle 70 is located in plenum 45, comprising an L-shaped member having a first leg tack welded to rear wall 50 and a generally horizontal second leg 71, projecting generally perpendicularly to wall 50 about 1¾ inches, about 1 inch below shoulder 65.

Each plenum 45 carries a burner plate 72 which substantially completely covers the upper opening of each plenum 45, and which are supported by shoulder 65. Each burner plate 72 comprises at least two tiles 74 of low heat conductivity, each tile 74 having a plurality of holes 75 through which the gas-air mixture from plenum chamber 45 flows. Combustion of the gas occurs proximate the burner surface 76 of tiles 74, and heats the burner surface sufficiently that infrared radiation is emitted. It is preferred that tiles 74 comprise equal sized generally flat, rectangular ceramic blocks about ½ inch thick, about 8¾ inches long by 3½ inches wide, having cylindrical holes 75 about 0.05 inches in diameter perpendicular to burner surface 76 and generally uniformly distributed thereover. It is preferred that each of the tiles 74 comprise a single, integral ceramic tile of the dimensions stated. However, each of tiles 74 can comprise two or more ceramic blocks placed adjacent to one another to form a tile 74 of the desired dimensions. It is especially preferred that the tiles have about 200 holes per square inch of surface area, by perimeter measurement, and that the holes be about 0.0515 inches in diameter. It is also especially preferred that the tiles have a thermal conductivity of between about 0.002 and about 0.003 cal./sec./cm²/cm °C., measured at between 20° C. and 100° C. It is necessary that tiles 74 be able to withstand the operational temperatures of the barbecue grill of this invention, i.e., a temperature at burner surface 76 of between about 1600 degrees F. and about 1800 degrees F. Such a tile is available from Hamilton Porcelains Limited, Brantford, Ontario.

In general, it is desirable that a barbecue grill produce a generally uniform distribution of heat over the cooking grid surface. The barbeque grill of this invention employs four devices to uniformly distribute heat and radiation over grid 12: (1) plenum chambers 45 are located in spaced relationship from sidewalls 6,7, front wall 4, and rear wall 5 within cavity 8; (2) tiles 74 are separated by spacers to strategically locate tiles 74 within cavity 8; (3) tiles 74 are slightly angled away from one another, and; (4) heat and radiation are produced uniformly over tiles 74 as a result of the shape and size of plenum chamber 45. and the location of baffle 70. Each of these devices is explained in more detail below.

In the preferred embodiment, each plenum 45 carries a pair of tiles 74 separated by a spacer 79. Spacer 79 comprises an imperforate metal sheet, preferably stainless steel, the same length as the tiles (8¾ inches), carried by plenum 45 between each pair of tiles 74. It is preferred that spacer 79 comprise a sheet of 20 gauge 430 stainless steel. As can best be seen in FIGS. 4, 6 and 10, spacer 79 comprises a generally planar portion 80, generally flush with burner surface 76, generally parallel downwardly depending walls 81 generally perpendicular to portion 80, outwardly projecting legs 82 generally perpendicular to walls 81, and end caps 83 which enclose the ends of the channel created by portion 80 and walls 81. It is preferred that portion 80 be about 2 inches wide, thus creating a separation between pair of tiles 74 of about 2 inches. Walls 81 are adjacent to inside edges 85 of tiles 74, and legs 82 underlie tiles 74. It is preferred that walls 81 be about ⅝ inches high, and that legs 82 be about ¼ inch wide.

As can best be seen in FIGS. 5 and 10, outside edges 86 of tiles 74 rest adjacent to shoulder 65 and wall 67. Ends 88 of tiles 74 and end caps 83 are adjacent to wall 66. It is preferred that a gasket 90 reside about the perimeter of tiles 74, to prevent the escape of gas about the interface of tiles 74 and plenum 45 and spacer 79 and to minimize thermal conduction between tiles 74 and plenum chamber 45. It is also preferred that a gasket reside between end caps 83 and wall 66, to minimize thermal conduction between spacer 79 and plenum 45 and to prevent the flow of gas-air mixture around tiles 74 rather than through holes 75. If tiles 74 comprise multiple pieces of ceramic, a gasket should be interposed between the pieces to prevent gas leakage. A suitable gasket is "Fibrefrax", a silicon oxide-alumina material, about ⅛ inch thick.

It is preferred that burner plate 72 be fitted onto plenum 45 such that spacer portion 80 is generally horizontal and tiles 74 face away from one another slightly. Referring to FIG. 4, it is preferred that burner surfaces 76 slope away from portion 80 at an angle of from about 1 degree to about 5 degrees. The appropriate slope can be conveniently accomplished by sizing tiles 74, spacer 79, and gasket 90 such that their total width is slightly greater than the distance between walls 67. In that manner, inside edges of tiles 74 and legs 82 of spacer 79 are raised slightly above shoulder 65. During heating and cooling spacer 79 and tiles 74 expand and contract, at different rates. Gasket 90 acts as an expansion joint. During extended use gasket 90 may lessen in thickness. Shoulder 65, which is continuous about the perimeter of plenum 45, prevents burner plates 72 from collapsing into plenum 45.

In operation, the gas-air mixture flowing through tiles 74 is ignited to produce a low, generally continuous flame proximate burner surface 76. The gas may be ignited by any of various means, such as with a match, a torch, or with an electronicly produced spark. To facilitate the ignition of gas flowing through both tiles 74 of each plenum 45, gas transfer tubes 92 are provided. It is preferred that tubes 92 comprise U-shaped members about ½ inch high, ½ inch wide, and 2 inches long having lateral wings 93 which are tack welded to spacers 79 to form passages through which gas can flow from one tile 74 across spacer 79 to adjacent tile 74. It is preferred that tube 92 extend completely across spacer 79 such that ends 94 are adjacent tiles 74.

In a less preferred embodiment, a series of perforations is provided in spacer 79 in lieu of tube 92. Gas flows through the perforations, allowing the flame front to pass from one tile 74 to the adjacent tile 74.

Figure 2:
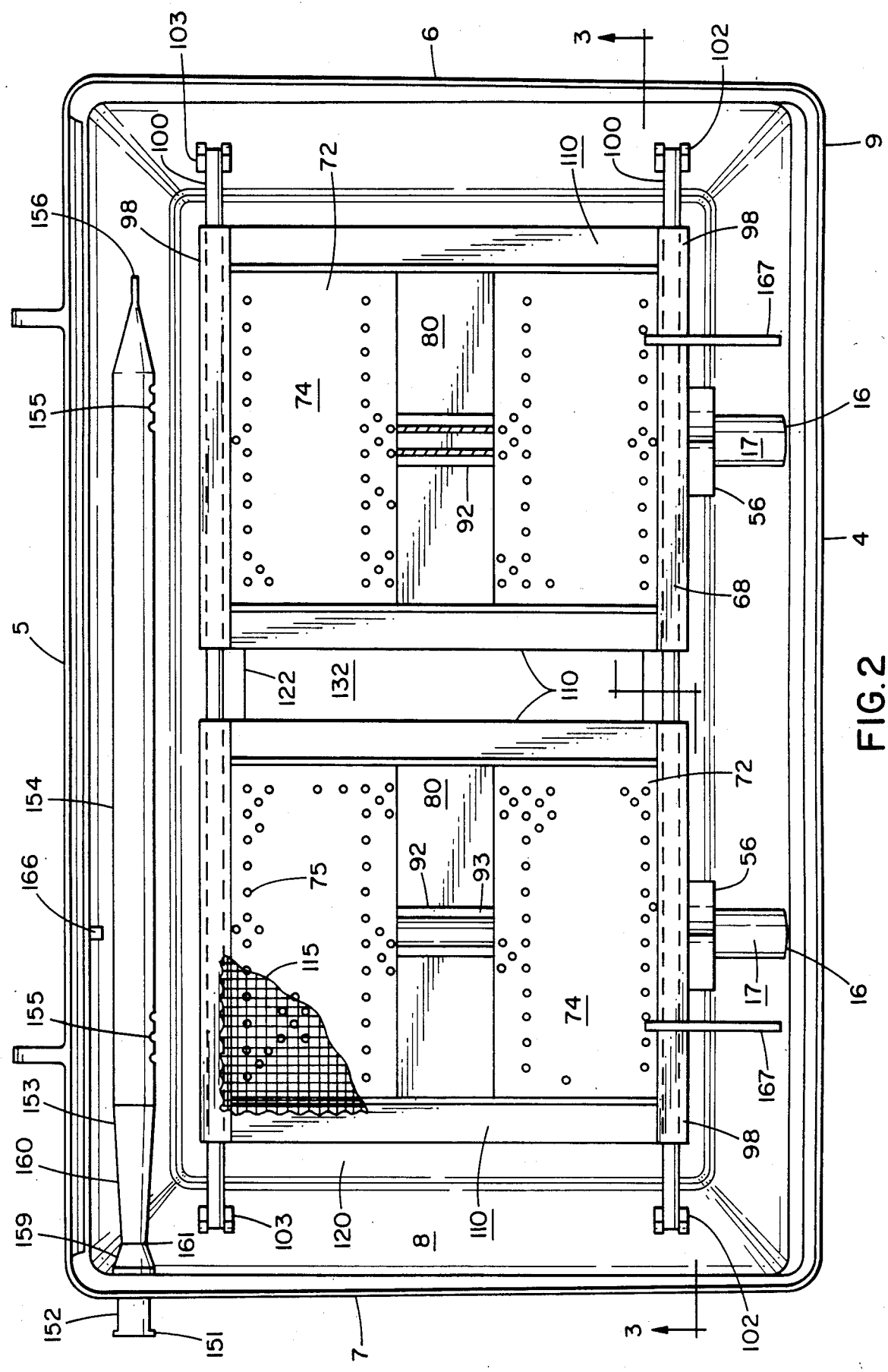
FIG. 2 is a top plan view of the container portion of the barbecue grill shown in FIG. 1, with the cover removed, with the reverberation screen shown in partial cutaway, with a horizontal section through the righthand transfer tube, and with the third burner bracket removed to show the third burner with a portion of the discharge holes.

As can best be seen in FIGS. 2 and 4, front wall 49 and rear wall 50 of plenum chambers 45 each carry a wall 95 which depends downwardly from top wall 68, which, with wall 66, creates inverted U-shaped suspension brackets 98 about ½ inch wide along the top of front wall 49 and rear wall 50. It is preferred that brackets 98 be formed as an integral part of plenum chamber 45, as by stamping. Each of brackets 98 is adapted to receive rod 100, and to support plenum chambers 45 therefrom. Rods 100 comprise generally straight steel rods about 23 inches long and about 5/16 inches in diameter. Each of side walls 6, 7 carries a front support bracket 102 and a rear support bracket 103, all four of which lie generally in a horizontal plane. Preferably support brackets 102 and 103 comprise U-shaped members integrally cast or welded to sidewalls 3. Front support brackets 102 and rear support brackets 103 are each adapted to support one rod 100 therebetween, in generally parallel relationship. Plenum chambers 45 are suspended by suspension brackets 98 between rods 100 in side-by-side relationship.

In an alternative, less preferred, embodiment, plenum chambers 45 can be provided with brackets 98 on sides 60. Two pairs of rods 100 extend between front wall 4 and rear wall 5, a plenum chamber 45 being suspended between each pair. By this means, plenum chambers 45 can be located at different heights within cavity 8. However, it is understood that in the preferred embodiment, plenum chambers 45 can be located at different heights within cavity 8 by use of non-linear rods having a high portion to accomodate one plenum chamber 45 and a low portion to accomodate the other plenum chamber 45, and by locating the pair of support brackets 102,103 supporting the low portion on side wall 6 at a lower height than corresponding support brackets 102,103 on the opposite side wall 7.

By suspending plenum chambers 45 from rods 100, and suspending rods 100 from sidewalls 3, the barbecue grill of this invention can be very easily assembled and disassembled. By loosening nut 34 and removing fitting 32 from plug 21, plenum chamber 45, duct 17, and plug 21 can be lifted as a single assembly from support rods 100 and removed from container 1. Support rods 100 can then be removed from container 1. Of course, plenum chambers and rods 100 can be so located that plenum chambers 45 can be lifted from rods 100 and removed from container 1 without the necessity of loosening any other parts of the grill. In that case, plenum chambers 45 would be located on rods 100 such that plenum chambers 45 could be moved away from front wall 4 sufficiently to release duct 17 from plug 21 without having to release plug 21 from frame 35.

It is notable that no drain or opening is required in floor 55 of plenum chambers 45, to remove liquids and particles which might accumulate in chambers 45. Although burner plates 72 are located below grid 12, separated only by reverberation screens 115, no substantial accumulation of liquids or food particles occurs in chamber 45. During operation of the grill of the invention, tiles 74 reach sufficient temperature to vaporize substantially all food and liquids which drop onto their surfaces. As noted above, reverberation screen 115 prevents larger food particles from reaching burner surface 72. Even when the grill is not in use accumulation in chambers 45 is unlikely. It has been found that rain water does not accumulate readily in chambers 45. Reverberation screens 115 tend to shield tiles 74 by scattering rain drops so that they hit tiles 74 at an angle, lessening the likelihood of water entry through holes 75. In addition, the surface tension of water tends to create water droplets of a size greater than holes 75. Angling tiles 74 away from one another also tends to reduce accumulation of materials within chambers 45. In any event, the novel construction of the barbecue grill of this invention facilitates removal of material which may accumulate in chambers 45. Plenum chambers 45 can be easily lifted from support rods 100 and inclined so that any accumulated material falls from chambers 45 through ducts 17.

As noted above, it is desirable to distribute the heat and infrared radiation uniformly over the surface of cooking grid 12. As can be seen in FIG. 2, tiles 74 together form a generally rectangular horizontal pattern generally centrally located in cavity 8. Each of the four tiles 74 is located in a corner of that pattern, spaced from one another and from sidewalls 3. The pattern formed by tiles 74 is generally dimensionally proportional to the exterior dimensions of grid 12. Edges 86 of tiles 74 are generally equally spaced from front wall 4 and rear wall 5, and ends 88 of tiles 74 are generally equally spaced from sidewalls 6,7 and from one another on adjacent plenum chambers 45. Spacers 79 separate tiles 74 on each plenum chamber 45. Tiles 74 are angled slightly away from one another on each plenum 45.

The location of plenums 45 away from sidewalls 6,7 and front and rear walls 4,5, serves a function in addition to uniform distribution of heat and radiation. By suspending plenums 45 in cavity 8, plenums 45 are surrounded by air passages which provide air to burner surfaces 76 and which also cool. plenums 45, thereby reducing the risk of flashback or spontaneous ignition within plenums 45. More importantly, thermal contact between burner surfaces 76 and container 1 is minimized, providing a barbecue grill which is much cooler at the exterior surfaces of container 1 than would otherwise be the case.

Also important is the surface area of tiles 74 relative to the cooking grid 12 area. It is preferred that the total tile 74 surface area be from about 25% to about 50% of the cooking grid 12 area, both areas calculated by perimeter measurement. It is most preferred that the ratio of tile 74 area to grid 12 area be about 0.3. Similarly, the ratio of tile 74 surface area to burner plate 72 surface area is important. It is preferred that the tiles 74 comprise from about 50% to about 90% of the burner plate 72 area. It is most preferred that the tiles 74 surface area comprise about 75% of the burner plate 72 surface area, both surface areas calculated on the basis of perimeter measurements.

The even distribution of heat and radiation over the area of grid 12 is also a function of the heat and radiation production pattern over the surface of tiles 74. It is preferred that heat and radiation production be distributed uniformly over the area of tiles 74. To this end, the size and shape of plenum chamber 45, and the location of baffle 70, is important. Plenum chambers 45 must be large enough in volume to properly mix the gas and air which enter through duct 17. In addition, the gas-air mixture must flow through tiles 74 at a generally uniform rate over the area of tiles 74. A higher flow rate in one location, or an excessively rich gas-air mixture, will create a hot spot in tile 74. Finally, plenum chamber 45 must be dimensioned such that flashback does not occur.

Flash back—or ignition of the gas-air mixture within plenum 45—occurs if the flow rate of the gas-air mixture through tiles 74 is less than the flame propagation rate, or if spontaneous ignition occurs within plenum 45 because of excessive temperatures within plenum 45. The gas flow rate through tiles 74 is a function of the total cross-sectional area of the holes therethrough. At the particular gas flow rate necessarily to produce sufficient radiation and heat for cooking (in this case, about 15,000 BTU's per hour maximum per plenum 45), the temperature within plenum 45 is a function of the volume of plenum 45, and the heat transfer between burner surface 72 and plenum 45. The use of insulation, as noted above, reduces heat transfer from burner surface 72 to plenum 45. It has been found that the configuration of plenum 45 intimately mixes the gas and air entering through duct 17 to produce a particularly uniform heat and radiation distribution pattern over tiles 74, while minimizing flashback.

An appropriate plenum chamber 45 can be generally described as follows: it has a generally rectangular upper opening with a length (between walls 67) to width (between walls 66) ratio of from about 0.8 to about 1.2; a depth (from shoulder 65 to floor 55) to width (between walls 66) ratio of about 0.3 to 0.5; inclined sides 60 of generally equal size; generally parallel trapezoidal front and rear walls 49 and 50, respectively; a floor 55 generally parallel to burner plate 72 of a width of from about 0.25 to about 0.4 times the width of the upper opening; a gas inlet opening having a diameter from about 0.25 to about 0.4 the depth of the plenum, with its axis generally equidistant from sides 60 and located a distance from floor 55 from about 0.25 to about 0.4 the depth of plenum 45; a gas-air inlet projecting into plenum 45 from about 0.1 to about 0.3 the distance between walls 49 and 50; a generally horizontal baffle extending generally between sides 60, located a distance from floor 55 about 0.5 to about 0.75 the depth of plenum 45, and projecting into plenum 45 from about 0.15 to about 0.3 of the distance between front and rear walls 49,50.

Surprisingly, it has been found that spacers 79 do not increase the tendency of spontaneous ignition within plenum chambers 45. It had been thought that placement of a relatively thin, high thermal conductivity metal surface over plenum 45, in close proximity to a relatively thick, low thermal conductivity ceramic surface such as tiles 74, would tend to increase the ambient temperature in plenum 45 to a degree that spontaneous ignition would occur. During operation spacers 79 get hot enough to vaporize most food and liquids which drop onto them, yet do not reach sufficient temperature to cause spontaneous ignition within plenum 45. Metal spacers 79 are superior to ceramic spacers, since only the former reach a high enough temperature to be self-cleaning. Ceramic spacers of a thickness necessary for structural support of tiles 74 would not reach a temperature sufficient to incinerate food and liquids which dropped onto them, and would accumulate residue. In addition, when cleaning is necessary, metal spacers 79 have sufficient structural strength to withstand abrasion without the risk of breakage inherent in ceramic spacers.

Figure 3:
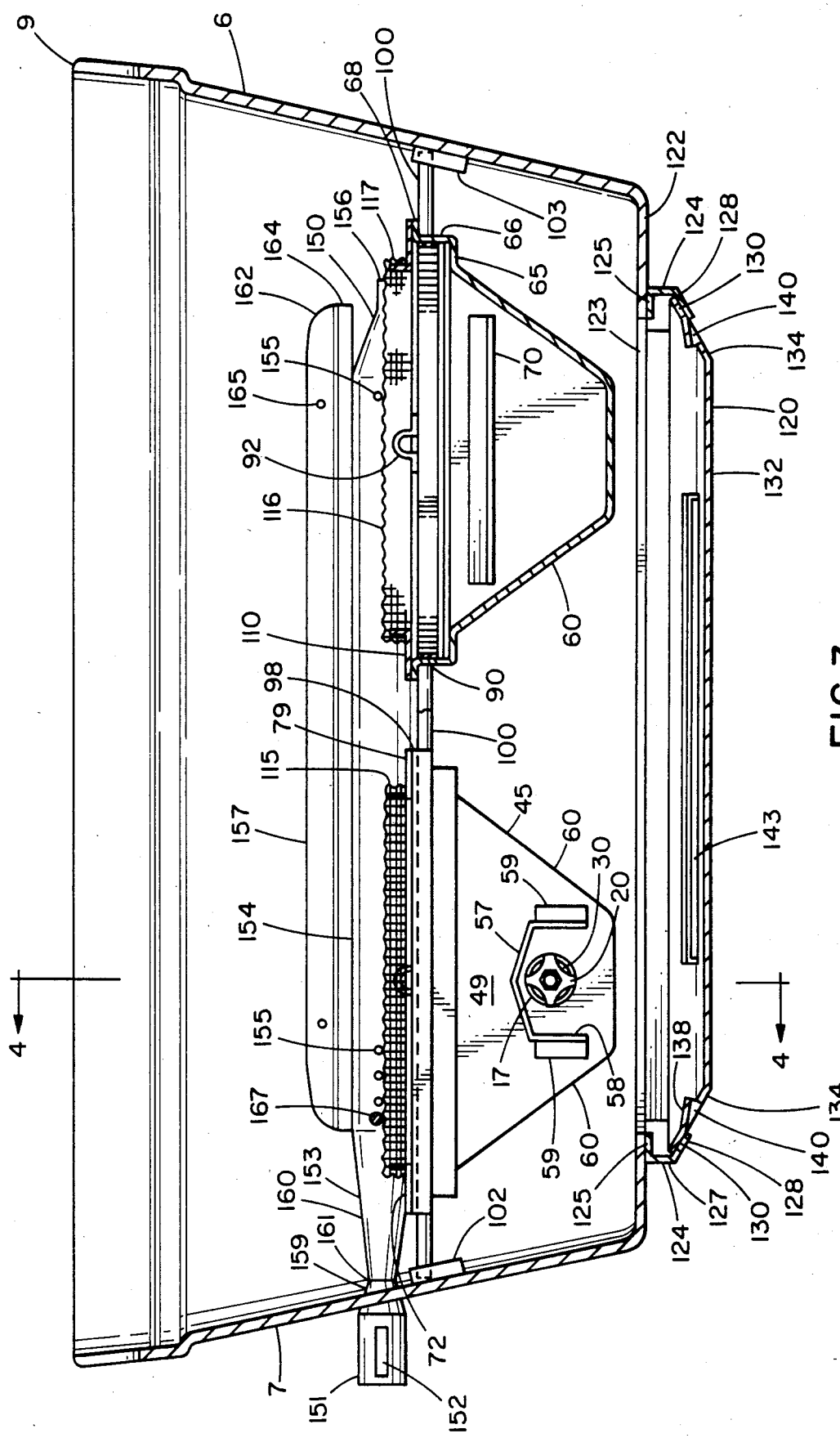
FIG. 3 is a cross sectional view taken on lines 3—3 of FIG. 2, with the third burner bracket in place.
Figure 6:
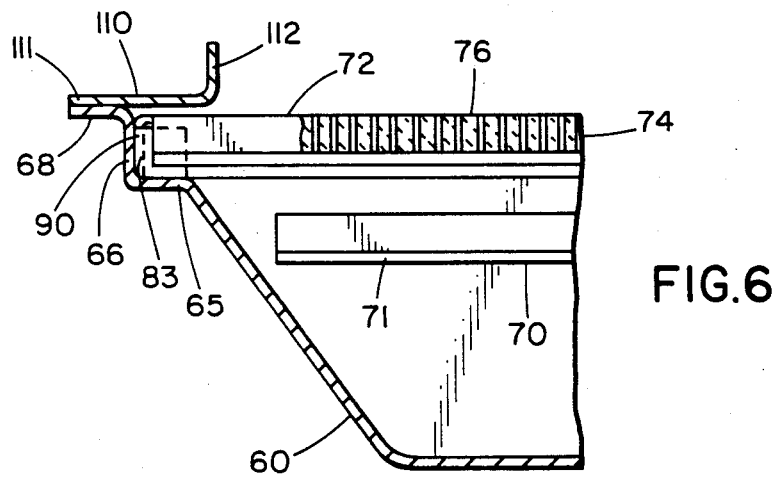
FIG. 6 is a cross sectional view taken on lines 6—6 of FIG. 5.
Figure 7:
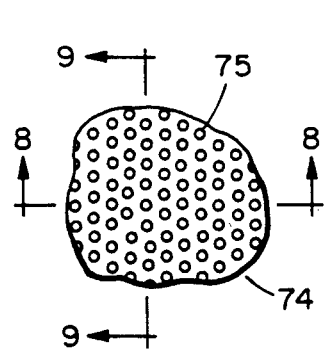
FIG. 7 is a fragmentary top plan view of a tile.
Figure 8:
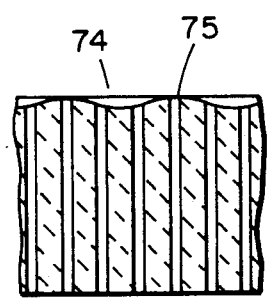
FIG. 8 is an fragmentary cross sectional view taken on lines 8—8 of FIG. 7.
Figure 9:
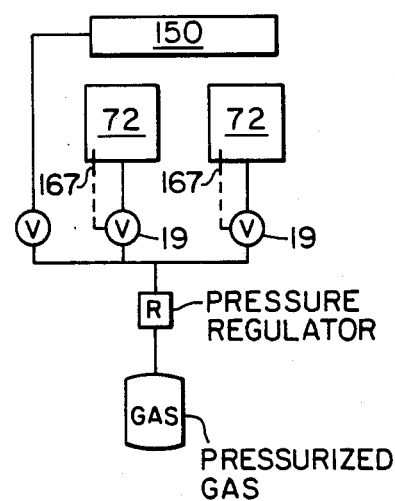
FIG. 9 is a schematic diagram of the barbecue grill of this invention.

As can best be seen in FIGS. 1, 3, and 6, a pair of tile clips 110 is affixed to each plenum 45 along the upper portions of sides 60. In the preferred embodiment, each tile clip 110 comprises an L-shaped aluminized steel member about 8 inches long, having a first leg 111 about 1 inch wide tack welded to top wall 68 of side 60. Leg 111 projects horizontally inward from wall 68 and ends in an upwardly extending second leg 112 about 0.25 inch high. Tile clips 110 serve to hold burner plate 72 in place on plenum 45, and to support reverberation screen 115 above burner plate 72.

Reverberation screen 115 comprises a generally rectangular woven wire screen, having a horizontal top surface 116 of similar dimensions to burner plate 72. Reverberation screen 115 sits on second legs 112 above burner plate 72, with sides 117 depending downward about 0.5 inches toward burner plate 72. Reverberation screen 115 serves to shield burner surface 76 from wind currents, and to increase the infrared radiation emitted by burner plates 72. It is estimated that burner surface 76 temperature is elevated by about 100 degrees F. by the use of reverberation screen 115. In addition, reverberation screen 115 prevents food particles having a dimension larger than about $\frac{1}{4}$ inch from falling onto tiles 74. Such food particles are suspended by reverberation screen 115 and are incinerated, thereby lessening the likelihood of plugging holes 75.

Figure 11:
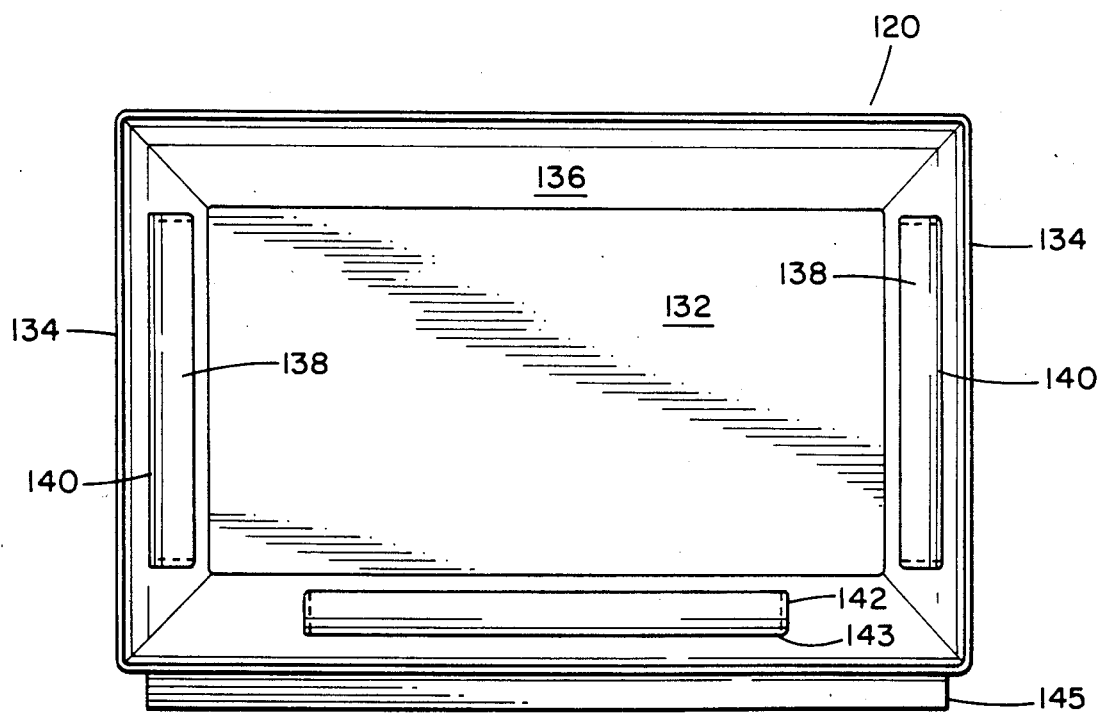
FIG. 11 is a top plan view of the drawer.
Figure 12:
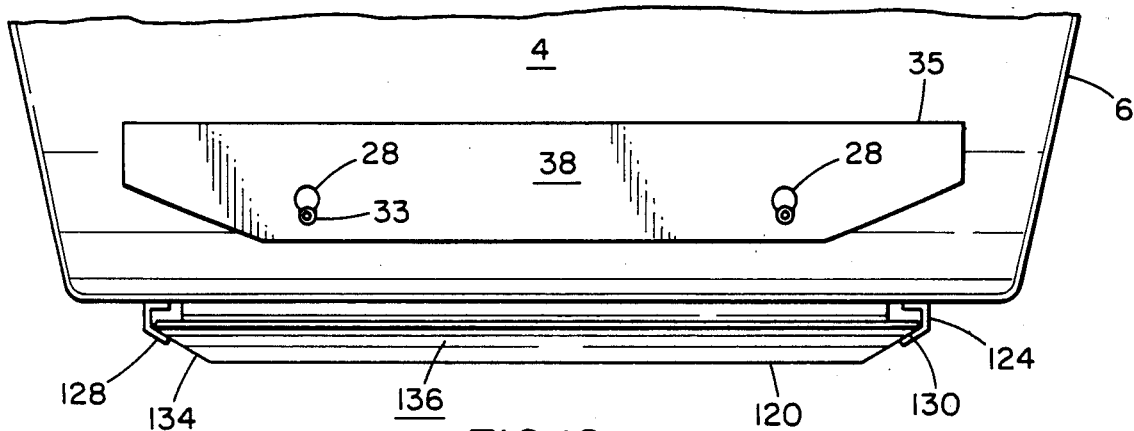
FIG. 12 is a partial cross sectional view taken on lines 12—12 of FIG. 5.

As can best be seen by FIGS. 3, 4, and 11, tray 120 is suspended below container 1 to catch food and liquid which drops through container 1. Sidewalls 3 of container 1 converge with bottom wall 122 which defines a generally rectangular opening 123 in container 1 of about 16 inches by about 8 inches. Depending from bottom wall 122 proximate and on either side of opening 123 are a pair of parallel tray runners 124. Each tray runner 124 comprises a generally horizontal member 125 which is affixed to bottom wall 122 by bolts or other means, a downwardly depending vertical section 127, and an inclined ledge 128. Ledges 128 are adapted to slidingly engage shoulders 130 of tray 120, to allow tray 120 to be moved to a position under opening 123, and to allow tray 120 to be withdrawn from container 1 for cleaning.

Tray 120 comprises a generally planar imperforate central rectangular portion 132 slightly smaller in dimension than opening 123, inclined sides 134, inclined back 135, and inclined front 136, all inclined upwardly and outwardly from central portion 132 at approximately the same angle. Inclined sides 134 have raised portions 138 which define air vents 140. Inclined back 135 has a similar raised portion 142 which defines front air vent 143, and also a handle 145 by which tray 120 can be moved. Air vents 140 are approximately 8 inches wide and $\frac{1}{4}$ inch high. Air vent 143 is approximately 10 inches wide and $\frac{1}{4}$ inch high.

In a less preferred embodiment, bottom wall 122 supports tray 120 within container 1. Opening 123 comprises a generally rectangular opening somewhat smaller than tray 120. The lower portion of rear wall 5 is cut out to form a generally rectangular opening in rear wall 5 as a continuation of opening 123. The opening in rear wall 5 is sized to accomodate back 135 when tray 120 is in its closed position. Bottom wall 122 forms a ledge within container 1 which slidably supports sides 134 or portion 132 of tray 120. A channel is carried on the inside surface of each side wall 6,7, spaced from bottom wall 122 a distance slightly greater than the height of tray 120, adapted to slidably engage sides 134 to facilitate the movement of tray 120 on bottom wall 122 over opening 123.

As noted above, gas at burner surfaces 76 can be ignited by various mechanisms. Because of the relatively large burner surfaces 76, the gas flow rate at any point is relatively low. Although it is possible to ignite the gas flowing through tiles 74 using a spark igniter, a match, or other conventional means, a larger more intense point of ignition is desirable. In the preferred embodiment, a third burner system 150 is provided which functions as a rotisserie burner and also as an igniter of gas above the burner plates 72. Burner system 150 comprises a gas inlet pipe 151 having air openings 152, venturi 153, a tube 154 having gas discharge ports 155 along its length and closed at its end 156 opposite venturi 153, and a bracket 157 by which tube 154 is affixed to container 1. Gas burning at discharge ports 155 provides the larger more intense point of ignition desirable for burner plates 72. Igniter port 158 in tube 154, and piezoelectric spark generator 166, provide means to ignite the gas-air mixture discharged from ports 155.

Tube 154 is preferably generally cylindrical, about 18 inches long and about one inch outside diameter. Tube 154 is preferably supported by bracket 157 in a generally horizontal position about 1.25 inches from rear wall 5 and adjacent to burner plates 72, as by bolts through bolt holes 165 in bracket 157. It is preferred that there be about 65 discharge ports 155 through tube 154, each about 0.07 inches in diameter, arranged in single file, equally spaced on about 0.25 inch centers, along about 16 inches of the length of tube 154, such that the gas-air mixture from tube 154 is discharged through ports 155 over burner plates 72. It is preferred that discharge ports 155 be located circumferentially on tube 154 between about 15 degrees above a horizontal plane passing through the axis of tube 154 to about 10 degrees below the horizontal plane, such that the gas-air mixture from tube 154 is discharged over burner surfaces 76. It is especially preferred that discharge ports 155 be located generally on a horizontal plane passing through the longitudinal axis of tube 154.

It is preferred that venturi 153 comprise an inlet portion 159 about 0.375 inches long and an outlet portion 160 about 2.25 inches long, joined by a neck portion 161 about 0.56 inches in inside diameter. It is also preferred that inlet pipe 151 be about 1.2 inches long, and that air openings 152 comprise two opposite openings about 0.75 inches high by about 0.03 to about 0.09 inches long.

Bracket 157 preferably comprises an L-shaped member having a first leg 162 affixed to tube 154 and having a second leg 163 affixed to rear wall 5. It is preferred that a flame director 164 project at about a 45 degree angle from first leg 162. Flame director 164 comprises an extension of first leg 162, extending the full length of leg 162, and about 0.25 wide, spaced about 2.25 inches from rear wall 5.

Igniter port 158 preferably comprises a slot in tube 154 proximate the mid-portion of one of plenum chambers 45. It is preferred that the slot be between about 0.02 inches and about 0.1 inches wide, begin about 0.125 inches to about 0.5 inches about the circumference of tube 154 from ports 155, and extend between about 20 degrees and about 150 degrees about the circumference of tube 154. It is most preferred that port 158 be about 0.03 inches wide, begin about 0.25 inches from ports 155, and extend more than 90 degrees circumferentially to about 45 degrees below a horizontal axis through the axis of tube 154. Less preferably, igniter port 158 can comprise a series of apertures in tube 154 of between about 0.02 inches and about 0.1 inches in diameter and extending about the circumference of tube 154 as noted above. In either configuration, the critical points are that igniter port 158 be sufficiently close to spark generator 166 that a spark from spark generator 166 can ignite gas flowing from port 158, and that port 158 be sufficiently close to discharge ports 155 that the flame created at port 158 can be propagated to the gas discharged from ports 155.

Discharge ports 155 necessarily have a greater cumulative area for gas flow than igniter port 158, since the former are intended to provide sufficient gas to produce a flame sufficient for cooking food placed on grid 12 or suspended from a spit above grid 12. Igniter port 158 is intended to act as a pilot flame for burner system 150, and consequently need only be of sufficient size and location to allow the ignition of gas escaping therefrom by generator 166 and to ignite gas escaping from ports 155.

During start-up operation, a valve, operated by a control at the front of container 1, is opened to allow gas to flow into inlet pipe 151. The gas can be supplied from the same source which supplies burner plates 72. Air is drawn through openings 152, and the gas-air mixture flows through venturi 153 and into tube 154. The gas-air mixture exits tube 154 through discharge ports 155 and ignition port 158. Piezoelectric spark generator 166, carried by rear wall 5 adjacent to port 158 and operated by a control at the front of container 1, ignites the gas as it is discharged from port 158. Alternatively, or in addition, an opening can be provided in rear wall 5 adjacent to port 158 to enable a user to insert a match through rear wall 5 to light gas exiting port 158. Also alternatively, a second port 158 can be provided adjacent to an opening in rear wall 5 for manually lighting burner system 150. In either case, because of the proximity of port 158 to ports 155, the flame established along port 158 ignites the gas discharged from ports 155.

Once a flame has been established at ports 155, one or both valves 19 can be opened to allow gas to enter plenums 45 for burning at burner surfaces 76. Valves 19 comprise manually operable valves coupled with thermocouples 167 which extend through front wall 4 and are located about 0.75 inches above reverberation screens 115. A valve 19 is associated with each plenum chamber 45, so that plenum chambers 45 can be operated independently of one another. Until thermocouple 167 senses a flame above burner surface 76, valve 19 must be held open manually. When valve 19 is held open, gas flows through tiles 74 to burner surfaces 76 where is it ignited by the flames at ports 155. If the flame above a burner surface 76 is extinguished, as by a gust of wind, thermostat 167 turns off valve 19 associated with that burner surface 76. Burner system 150 can be operated independently of, or in addition to, burner plates 72.

In an alternative embodiment, thermocouples 167 are carried by rear wall 5 about 0.75 inches above reverberation screens 115. Each thermocouple 167 is located to sense a flame from either tiles 74 or burner system 150. If no flame is present adjacent to one of the burner surfaces 76, either from ignition of gas flowing through tiles 74 or from ignition of gas flowing through ports 155, valve 19 which supplies gas to that burner surface 76 is rendered inoperable by thermocouple 167. Consequently, gas cannot be supplied to a plenum 45 unless either third burner 150 is in operation or gas flowing through plenum 45 is being burned at burner surface 76. If the flame at burner surface 76 is extinguished, as by a gust of wind, the valve supplying gas to that burner surface 76 will close unless third burner 150 is in operation. In the latter case, thermocouple 167 would sense the flame from third burner 150 and keep valve 19 open.

The parts of the barbecue grill of this invention can be made of any conventional or conveniently available materials. It is preferred that container 1 and cover 2 be made of cast aluminum, that grid 12 be made of cast iron or cast aluminum, that spacers 79 be made of stainless steel, and that rods 100 be made of drawn steel. It is preferred that jet 20 be made of brass. Except as noted, it is preferred that all other parts discussed above be made of aluminized sheet steel of 18 or 20 gauge.

The preferred embodiment described above is illustrative of, and not exclusively definitive of, the barbecue grill of this invention. It is obvious that many variations to the above described embodiment may occur to one skilled in the art, and that those variations fall within the intent and scope of the invention and the claims set forth below.

I claim:
1. In a gas barbecue grill comprising:
   (a) a container having upstanding sidewalls forming a cavity having an upper opening,
   (b) a cover affixed to said container, movable to a closed position to substantially cover said upper opening and movable to an open position,
   (c) a grid suspended from said upstanding sidewalls proximate said upper opening, having a generally horizontal portion adapted to support food,
   (d) a heat generating system comprising:
      (i) a plenum chamber supported within said cavity below said grid, comprising walls forming a chamber having a top opening and a gas inlet port,
   the improvement comprising:
      (ii) a burner plate supported by said plenum chamber, substantially covering said top opening and comprising at least two spaced tiles of low heat conductivity each having a burner surface and a plurality of holes therethrough adapted to allow the exit of gas from said plenum chamber to said burner surface, said tiles being separated by a spacer which is impervious to the passage of gas therethrough and of high heat conductivity to present a surface which in use of the grill reaches a temperature sufficient to vaporize foods dropping thereon and insufficient to cause spontaneous ignition within the plenum,
      (iii) means on said burner plate to propagate gas flame between said tiles across said spacer,
      (iv) a gas inlet duct having a longitudinal axis, having a proximate portion affixed to said plenum chamber and adapted to introduce gas into said plenum chamber through said gas inlet port, having a distal end exterior to said plenum chamber, and having an air inlet opening exterior to said plenum chamber between said proximate end and said distal end,
      (v) a gas jet affixed to said distal end of said gas inlet duct, having a gas discharge orifice generally on said axis, and
   (e) means for connecting said gas jets to a source of combustible gas, whereby gas can be introduced to said gas jets and discharged through said orifices into said gas inlet ducts, mixed with air drawn into said ducts through said air inlet openings to create a gas-air mixture, said mixture being introduced into said plenum chambers and further mixed to create an intimate gas-air mixture, said intimate mixture being forced through said holes in the spaced tiles of said burner plates and burned proximate said burner surfaces to create heat and infrared radiation suitable for cooking food disposed on said grid.

2. The barbecue grill of claim 1 wherein the tiles of the plenum chamber comprise two ceramic tiles each having a generally rectangular burner surface of generally equal size, said spacer comprising a metal sheet, and each of said tiles having from about 100 to about 400 holes per square inch of burner surface area, calculated by perimeter measurements.

3. The barbecue grill of claim 2 wherein the ratio of the total burner surface area of said tiles to the total surface area of said grid is from about 1:2 to about 1:4, said surface areas calculated by perimeter measurements.

4. The barbecue grill of claim 3 wherein said burner plates are spaced from said sidewalls and from one another, said top openings are of generally rectangular configuration, and said tiles are spaced apart such that together said burner surfaces form a generally rectangular generally horizontal pattern, the total area of said burner surfaces of said tiles comprising from about 50% to about 90% of the total surface area of said pattern, said areas calculated by perimeter measurements.

5. The barbecue grill of claim 4 wherein each of said plenum chambers carries a first tile and a second tile, said burner surfaces of said first tiles generally residing in a first plane and said burner surfaces of said second tiles generally residing in a second plane, each plane inclined from the horizontal by from about 1 degree to about 5 degrees about a horizontal axis between said first tiles and said second tiles, said tiles residing below a horizontal plane through said axis, such that said first and second tile burner surfaces are inclined away from one another.

6. The barbecue grill of claim 4 wherein said plenum chamber has generally trapezoidal end walls of generally equal dimensions, generally rectangular side walls of generally equal dimensions, said end walls and said side walls forming a generally rectangular, generally horizontal top opening, and a generally rectangular floor having an area from about 0.25 to about 0.4 times the area of said top opening, one of said end walls having a gas inlet opening therein.

7. The barbecue grill of claim 4 wherein said ducts have generally uniform cross-sectional areas between said proximate ends and said distal ends.

8. The barbecue grill of claim 4 including a pair of rods extending in a generally parallel manner between opposite sidewalls of said container and said plenum chamber walls carry first brackets adapted to engage said rods to suspend said plenum chamber therebetween.

9. The barbecue grill of claim 8 wherein each of said rods has a pair of ends and each of said said sidewalls carries a pair of second brackets each of which is adapted to disengagedly support one of said ends, and wherein said first brackets project from said plenum chamber walls proximate said top opening, such that said plenum chambers and said rods may be conveniently installed and removed from said container.

10. The barbecue grill of claim 9 wherein said sidewalls terminate in a lower edge defining a lower opening, and said sidewalls carry channels proximate said lower opening by which a tray is slidably supported, movable to a first closed position in which said tray substantially covers said lower opening and to an open position in which said tray projects from said container such that it is accessible for cleaning.

11. The barbecue grill of claim 10 wherein said gas is introduced to said gas jet at a pressure of between about twenty inches and about sixty inches of water.

12. The barbecue grill of claim 1 wherein the spacer comprises a sheet of stainless steel coextensive with the tiles separated thereby and having an upper surface substantially planar therewith.

13. A gas barbecue grill comprising:
(a) a container having upstanding sidewalls comprising a front wall, a back wall, and cast metal sides, forming a cavity of generally rectangular horizontal cross section, said cavity being substantially open at the top and having lower sidewalls terminating in a generally horizontal plane forming a generally rectangular lower opening,
(b) a cover attached to said continer, movable to a close position to substantially cover said upper opening and movable to an open position,
(c) a generally horizontal grid carried by said sidewalls within said cavity proximate said upper opening, adapted to support food,
(d) a burner system carried by said sidewalls within said-cavity below said grid, adapted to cook food supported by said grid, comprising a pair of gas inlet ducts, plenum chambers, and burner plates on said plenum chambers, said burner plates having upper surfaces and having a plurality of holes in said upper burner surfaces adapted to allow the exit of gas from said plenum chambers and the burning of said gas proximate said burner surfaces,
(e) a tray carried by said container below substantially all of said burner system, adapted to substantially cover said lower opening in a closed position to catch food droppings from said grid, and adapted to be movable to an open position to facilitate removal of said food droppings,
(f) means for connecting said gas inlet ducts to a source of combustible gas,
(g) a rotisserie burner comprising a tube having a gas inlet opening adapted to be connected to a gas supply and having first perforations adapted to allow gas to flow from said tube and to burn proximate said burner surfaces, and
(h) a spark generator and said spark generator and said tube being carried by said back wall, said tube having a generally horizontal longitudinal axis and having a second perforation adapted to discharge gas adjacent to said spark generator and to propagate a flame created by said spark generator to said first perforations.

14. The barbecue grill of claim 13 wherein said tray comprises a slidable drawer.

15. The barbecue grill of claim 14 wherein a pair of parallel generally horizontal channels depend from said lower sidewall proximate said lower opening and said drawer has lateral edges adapted to be received by said channels such that said drawer is suspended below said lower opening in its closed position and is slidably removable for cleaning.

16. The barbecue grill of claim 13 wherein support rods are removably supported between opposite sides of said container, a pair of plenum chambers is supported by said support rods within said cavity spaced from said sidewalls, and said burner plate being carried by each of said plenum chambers comprising a tile of low heat conductivity having a plurality of holes therethrough adapted to allow the exit of gas from said plenum chambers.

17. The barbecue grill of claim 16 wherein said support rods are supported by sáid sidewalls generally horizontally and each of said burner plates comprise at least two ceramic tiles separated by a plate impervious to the passage of gas, and means exist on said burner plates to propagate gas between said tiles.

18. The barbecue grill of claim 17 wherein each of said gas inlet ducts has a proximate end connected to one of said plenum chambers and a distal end carrying a gas jet having a gas discharge orifice, said gas inlet ducts having generally uniform cross-sectional areas between said proximate ends and said distal ends.

19. The barbecue grill of claim 13 wherein said second perforation comprises a circumferential slot having a first end adjacent to said spark generator and a second end adjacent to said first perforations.

20. In a gas barbecue grill comprising:
(a) a container having upstanding sidewalls forming a cavity having a generally open upper end,
(b) a grid suspended generally horizontally from said upstanding sidewalls proximate said upper end, adapted to support food for cooking;
the improvement comprising:
(c) a pair of gas inlet ducts having distal ends carrying gas inlet jets and having proximate ends, and means for connecting said-gas jets to a source of pressurized combustible gas,
(d) a pair of plenum chambers, each of which has a gas inlet port adapted to receive one of said gas inlet ducts, and each of which plenum chambers has an upper burner plate comprising at least two tiles of low heat conductivity material having upper burner surfaces and a plurality of holes therethrough, and a separator plate interposed between a pair of said at least two tiles and impervious to the passage of gas therethrough,
(e) means associated with said burner surfaces to propagate gas flame between said tiles across said separator plate on each of said plenum chambers,
(f) said gas inlet ducts having generally uniform cross-sections,
(g) said means for connecting said gas jets to a source of combustible gas including a pressure regulating system providing gas to said jets at a pressure of greater than about 20 inches of water, wherein the necessity for modulation of combustion supporting air flow is avoided.

21. The barbecue grill of claim 20 wherein said tiles are spaced from one another and said burner surfaces define a generally rectangular horizontal pattern, and the ratio of the total burner surface area of said tiles to the surface area of said pattern is from about 1:1.2 to about 1:2, calculated by perimeter measurements.

22. The barbecue grill of claim 21 wherein the ratio of the total burner surface area of said tiles to the total surface area of said grid is from about 1:2 to about 1:4, calculated by perimeter measurements.

23. The barbecue grill of claim 20 wherein a third burner is provided, comprising a tube carried by said sidewalls, said tube having a first end adapted to be connected to a gas supply, a closed second end, and an intermediate portion having a front surface proximate said plenum chambers, said front surface having first perforations therein adapted to allow gas to flow from said tube and to be burn proximate said burner surfaces.

24. The barbecue grill of claim 23 wherein a spark generator is located adjacent to said tube, and said tube has a second perforation adjacent to said spark generator adapted to allow sufficient gas therethrough to allow ignition thereof by said spark generator to establish a flame adjacent to said second perforation, said second perforation located circumferentially on said tube between said spark generator and said first perforations and adapted to communicate said flame to said first perforations.

25. The barbecue grill of claim 20 wherein said gas inlet ducts include fixed size air inlets for introduction of combustion supporting air, said air inlets being dimensioned as a function of the pressure.

26. In a gas barbecue grill comprising:
(a) a container having upstanding sidewalls forming a cavity having an upper opening,
(b) a cover affixed to said container, movable to a closed position to substantially cover said upper opening and movable to an open position,
(c) a grid suspended from said upstanding sidewalls proximate said upper opening, having a generally horizontal portion adapted to support food, and
(d) a heat generating system comprising a plenum chamber supported within said cavity below said grid, comprising walls forming a chamber having a top opening and a gas inlet port, the improvement comprising:
a burner plate supported by said plenum chamber substantially covering said top opening and comprising at least two spaced tiles of low heat conductivity each having a burner surface and a plurality of holes therethrough adapted to allow the exit of gas from said plenum chamber to said burner surface, said tiles being separated by a spacer formed of sheet metal which is impervious to the passage of gas therethrough and of high heat conductivity to present a surface which in use of the grill reaches a temperature sufficient to vaporize foods dropping thereon and insufficient to cause spontaneous ignition of gas within the plenum, and
including means associated with said burner plate to propogate gas flame between said tiles across said spacer sheet.

* * * * *